J. C. BOHMKER & J. GEISTWHITE.
PLOW.
APPLICATION FILED AUG. 2, 1917.
1,275,209.
Patented Aug. 13, 1918.
4 SHEETS—SHEET 1.
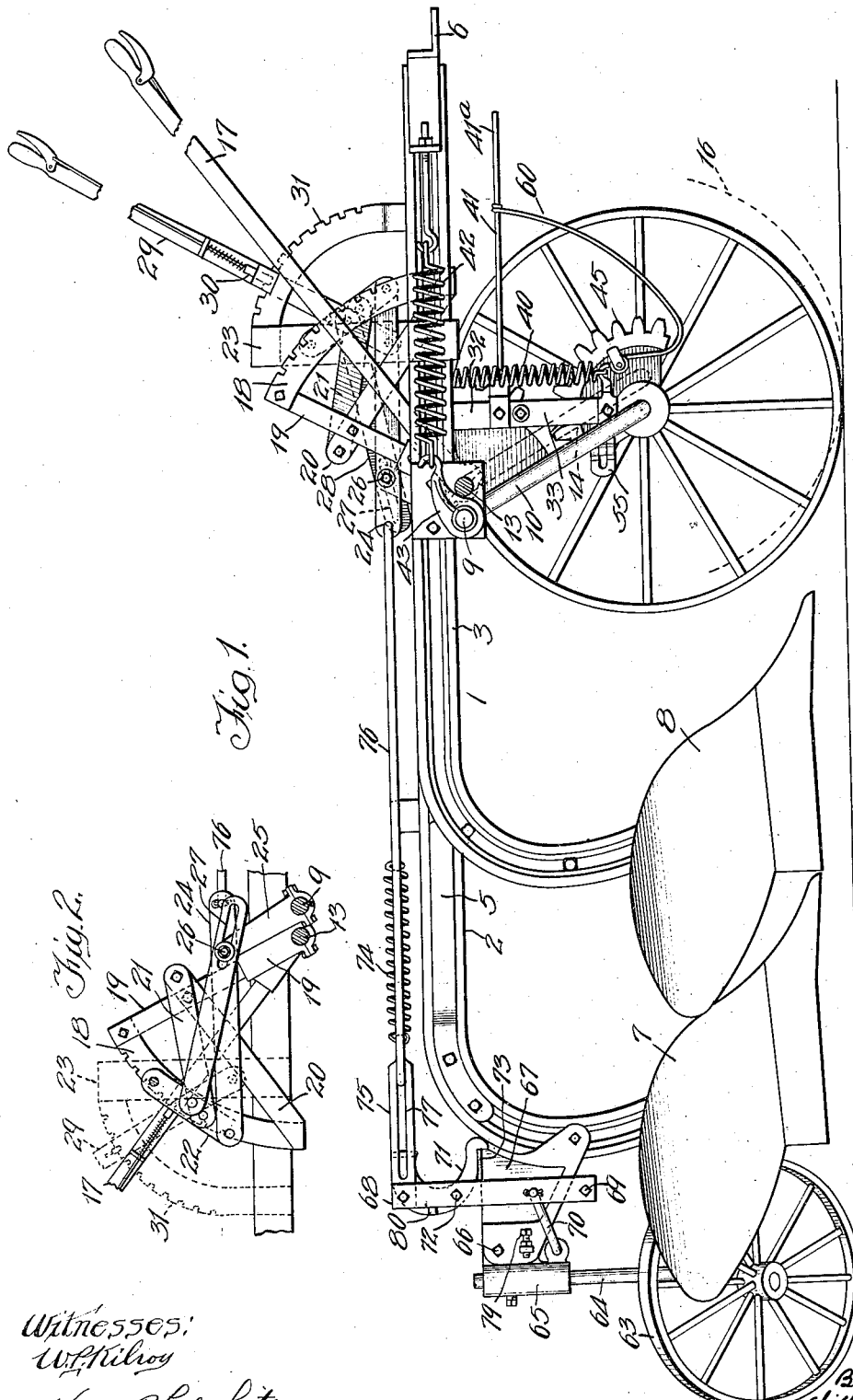
Witnesses:
W. F. Kilroy
Harry R. L. White.
Inventors
John C. Bohmker
John Geistwhite
By Miller, Churchill & Parker
Attys.

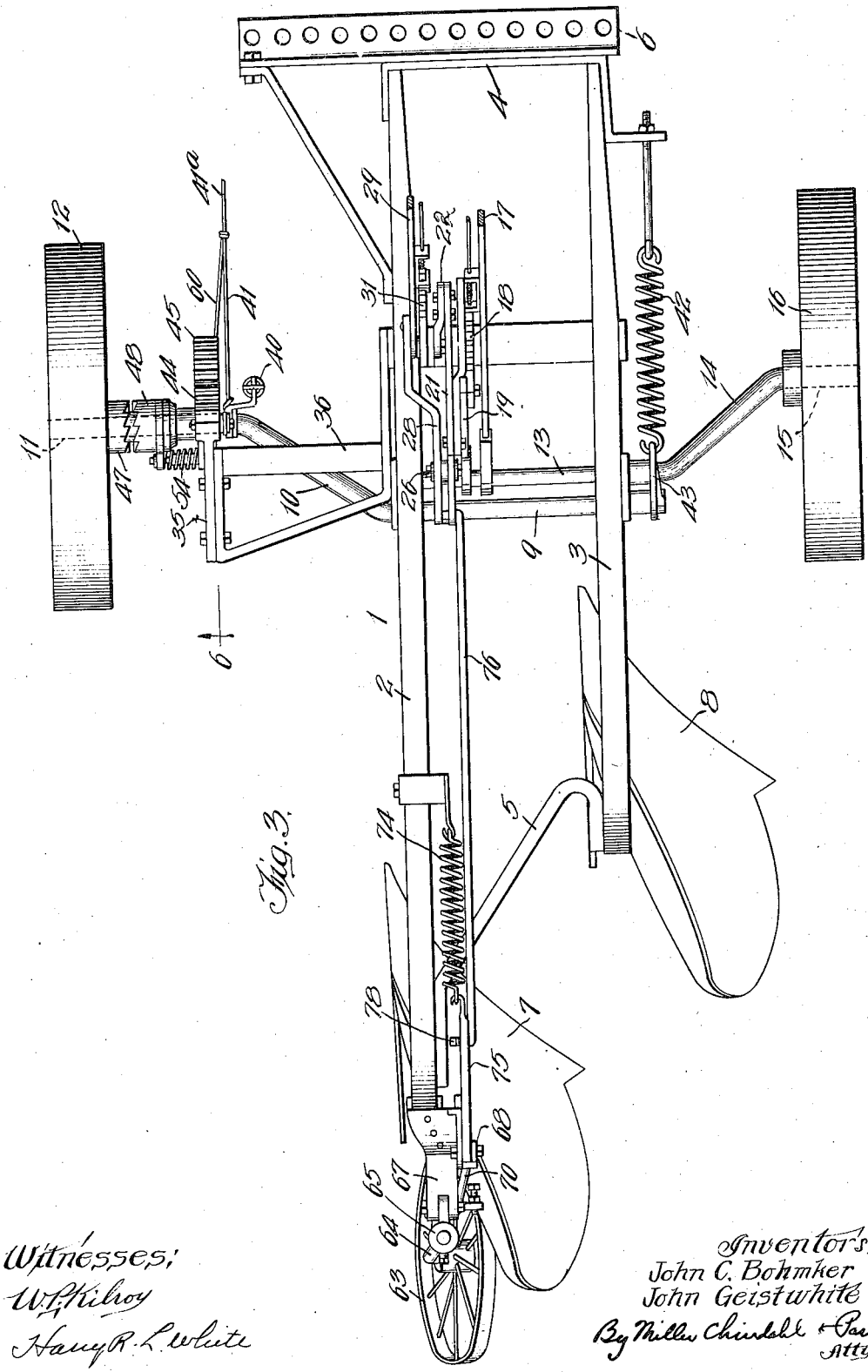

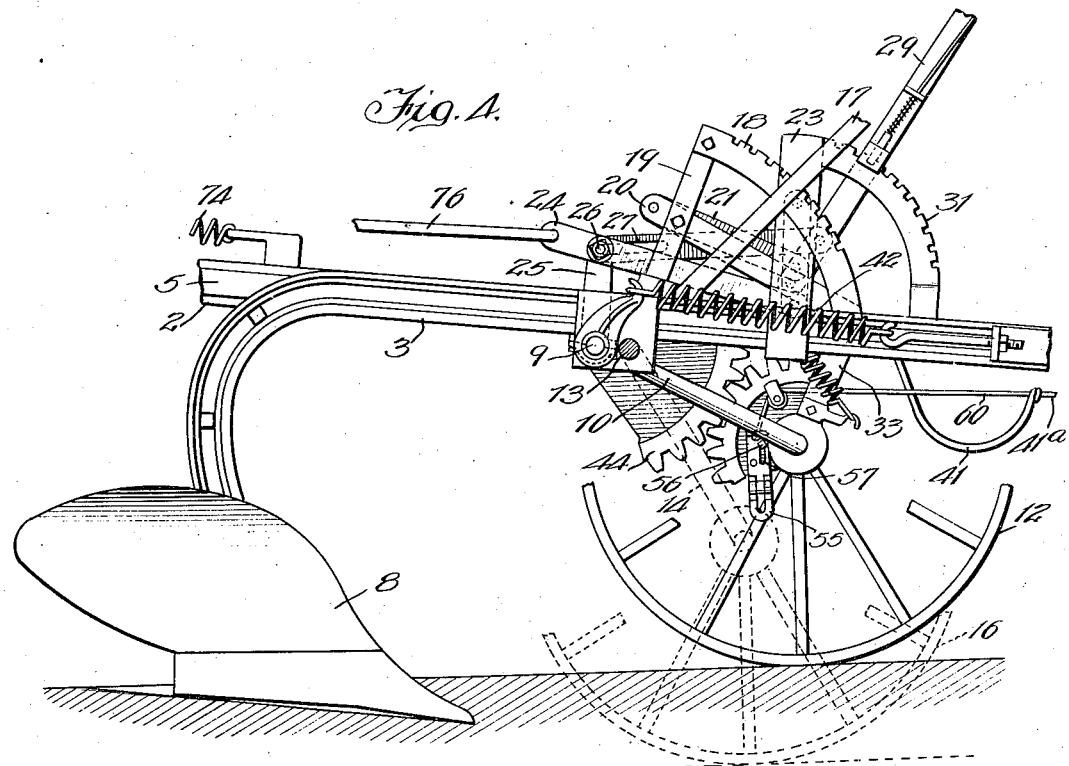

J. C. BOHMKER & J. GEISTWHITE.
PLOW.
APPLICATION FILED AUG. 2, 1917.
1,275,209.
Patented Aug. 13, 1918.
4 SHEETS—SHEET 4.
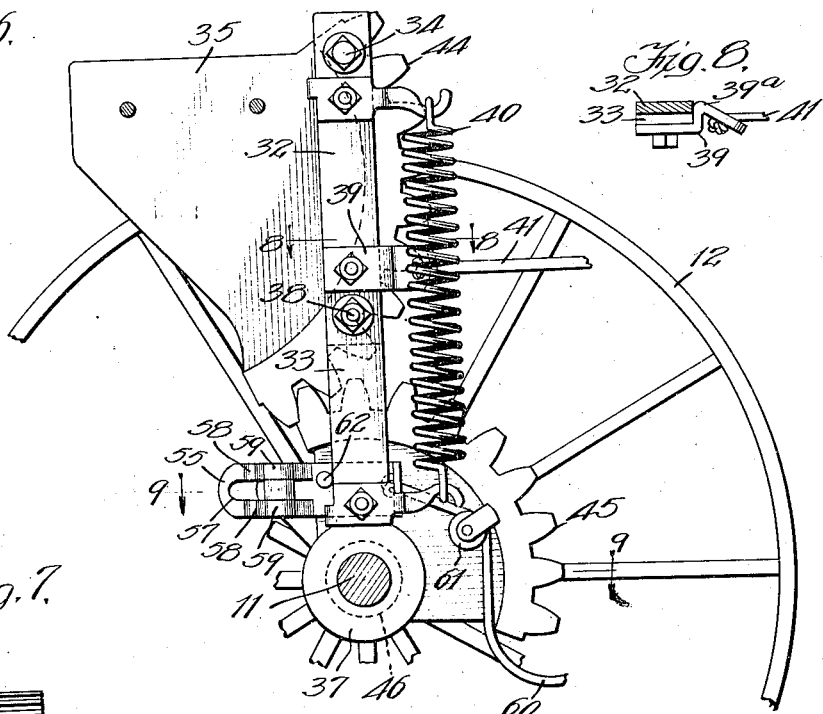
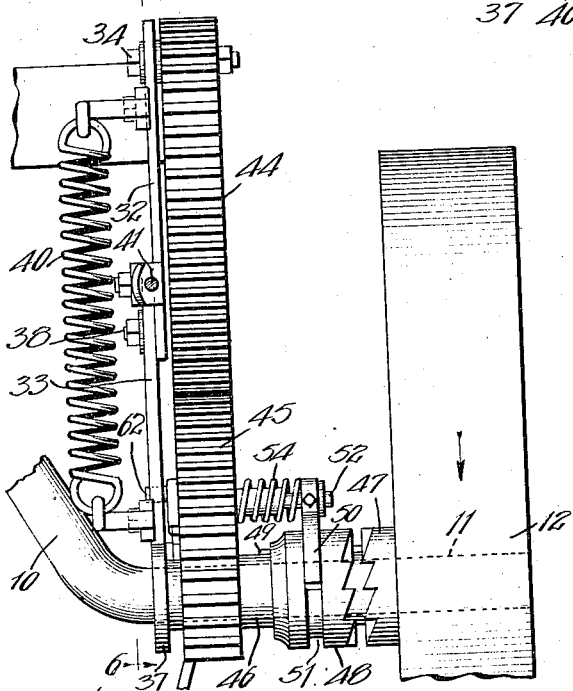
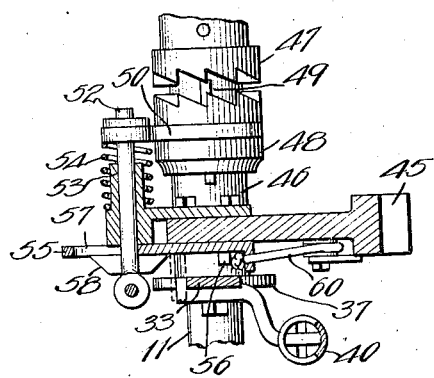
Witnesses:
W. F. Kilroy
Harry R. L. White
Inventors:
John C. Bohmker
John Geistwhite
By Miller Chindahl + Parker,
Attys.

UNITED STATES PATENT OFFICE.

JOHN C. BOHMKER AND JOHN GEISTWHITE, OF KANKAKEE, ILLINOIS, ASSIGNORS TO SEARS, ROEBUCK AND COMPANY, OF CHICAGO, ILLINOIS, A CORPORATION OF NEW YORK.

PLOW.

1,275,209.   Specification of Letters Patent.   Patented Aug. 13, 1918.

Application filed August 2, 1917.   Serial No. 184,074.

*To all whom it may concern:*

Be it known that we, JOHN C. BOHMKER and JOHN GEISTWHITE, citizens of the United States, residing at Kankakee, in the county of Kankakee and State of Illinois, have invented certain new and useful Improvements in Plows, of which the following is a specification.

This invention relates particularly to gang plows intended to be drawn by tractors, and has special reference to mechanism whereby the frame and the plow bodies supported thereby may be raised to withdraw the plow bodies from the ground and lowered to place the plow bodies in operative position. It is very desirable that the plow bodies shall enter and leave the ground point first, and it is the primary object of this invention to provide means whereby this result may be attained.

A further object of the invention is to provide simple and powerful means for raising the frame by power derived from one of the supporting wheels during the continuing forward movement of the plow.

A further object is to provide means whereby the rear end of the frame shall be automatically raised and lowered in proper time with reference to the rise and fall of the forward end of the frame.

In the accompanying drawings, Figure 1 is a side elevation of a plow embodying the features of our invention. Fig. 2 is a fragmental view of the adjustable connection between the land wheel and the front furrow wheel, taken from the side opposite to that shown in Fig. 1. Fig. 3 is a top plan view of the plow in the position shown in Fig. 1. Fig. 4 is a view of the forward portion of the plow showing the plow body as entering the ground. Fig. 5 is a view of the rear part of the plow showing the plow body emerging from the ground. Fig. 6 is a view taken approximately in the plane of dotted lines 6 of Figs. 3 and 7 and illustrating the lifting mechanism. Fig. 7 is a front elevation of said mechanism. Fig. 8 is a sectional detail taken in the plane of dotted line 8—8 of Fig. 6. Fig. 9 is a section on line 9—9 of Fig. 6.

The embodiment which has been selected to illustrate the invention comprises a rigid frame 1 consisting of two plow beams 2 and 3 rigidly secured together at their forward ends by a brace 4 (Fig. 3) and at their rear ends by a brace 5. The frame 1 may be provided with any suitable draft-appliance as, for example, the bar 6. To the rear ends of the beams 2 and 3 are attached plow-bodies 7 and 8, respectively.

A transverse rock-shaft 9 is mounted in the frame 1 and has at its left-hand end a crank portion 10 provided with an axle 11. Upon said axle is mounted the land wheel 12. Slightly forward of the shaft 9 is a similar rock-shaft 13 having at its right-hand end a crank portion 14 provided with an axle 15. Upon said axle is mounted the forward furrow wheel 16.

Means is provided for connecting the rock-shafts 9 and 13 together so that they shall rock in unison in raising and lowering the plow bodies. In order that the plow bodies may be leveled and caused to enter the ground to the same depth, the connecting means just mentioned is made adjustable. Although various constructions may be employed, that herein shown comprises a hand lever 17 rigidly secured to the shaft 13 and having a manually-operable detent of common construction arranged to engage a locking sector 18. The sector 18 is attached at one end to a bar 19 which is loosely pivoted on the shaft 13. The other end of the sector 18 is fixed to a bar 20 which is rigidly secured to the bar 19, the bars 18, 19 and 20 forming a rigid frame. A link 21 is pivoted at one end to the bar 20 and at its other end is pivoted to the link 22 which is pivoted at its upper end to a bar 23 that is fixed to the main frame 1. The lower end of the link 22 is pivoted to the forward end of a link 24 which link is pivoted near its rear end to a crank arm 25 fixed upon the shaft 9. The pivot stud or bolt that connects the link 24 and the crank arm 25 is indicated at 26. It will be seen that the linkage just described, in conjunction with the hand-lever 17 and locking sector 18, connects the rock-shafts 9 and 13 for simultaneous swinging movement. The linkage is so proportioned, however, that the furrow-wheel shaft 13 swings about twice as far as the land-wheel shaft 9.

The extent to which the forward portion of the main frame 1 descends when the plow bodies are entering the ground is limited by means to be now described. The pivot 26 carried by the crank arm 25 extends through an elongated opening 27 in the rear portion of a link 28, the forward end of said link being pivoted to a hand lever 29. Said hand lever is pivoted to the bracket 23 and is provided with a detent 30 arranged to engage a locking sector 31 which is rigidly connected to the plow beam 2 and the bracket 23. As indicated in Fig. 4, the descent of the forward end of the main frame 1 (or, in other words, approaching movement between the axles 11 and 15 and the main frame) is limited by stoppage of the pivot 26 against the rear end wall of the slot 27. The hand lever 29 may be locked in various positions along the sector 31 in accordance with the desired depth of furrow to be plowed.

Means is provided to limit upward movement of the forward portion of the main frame 1, or, in other words, to limit movement of the axles 11 and 15 away from the main frame. This means comprises a toggle consisting of links 32 and 33 (Figs. 1, 6 and 7), the link 32 being pivoted at 34 to a plate 35 which is fixed to a bracket 36 that is rigidly secured to the left-hand side of the main frame. The link 33 has a bearing 37 to receive the axle 11. 38 is the pivot that joins the links 32 and 33. The link 33 projects above the pivot 38 and is there provided with a bent lug 39 (Fig. 8) forming a stop 39ª arranged to engage the link 32 to limit pivotal movement between the links 32 and 33 in one direction. A tension spring 40 strained between the links 32 and 33 holds the toggle links in alinement, as indicated in Fig. 6. Any suitable means may be provided to flex the toggle against the tension of the spring 40. Herein is shown a cable 41 connected to the lug 39 and merging into a cable 41ª that extends forward to a point within convenient reach of the operator. A pull upon the cable 41 will cause the toggle to flex, whereupon the main frame 1 will settle until the pivot pin 26 stops against the rear end wall of the slot 27. A tension spring 42 (Figs. 1, 3 and 4) connected at one end to the main frame and at its other end to a crank arm 43 which is fast on the shaft 9, yieldingly resists the descent of the main frame and thus partially counter-balances the frame and cushions its descent.

We have provided power means for raising the frame 1 to remove the plow bodies 7 and 8 from the ground. The means herein shown for this purpose comprises a gear segment 44 formed, in this instance, integral with the plate 35, said segment meshing with a gear segment 45 which is rigid with a sleeve 46 that is rotatably mounted upon the axle 11. Rigid with the hub of the land-wheel 12 is a ratchet clutch member 47 adapted to be engaged by a clutch collar 48 that is mounted upon the sleeve 46. The collar 48 is slidable longitudinally of the sleeve 46 but is connected to rotate with said sleeve by means of a spline 49. It will be seen that when the collar 48 is slid into engagement with the clutch member 47, the gear segment 45 will be turned, said segment rolling along the non-rotatable segment 44 and thus causing said segment 44 and the main frame 1 to rise.

The means for moving the clutch collar 48 into and out of engagement with the clutch member 47 may be of any suitable character. Herein is shown a fork 50 engaging in a circumferential groove 51 in the clutch collar, said fork being fixed upon a rod 52 which is slidably mounted in a guide 53 fixed to gear segment 45. An expansion spring 54 tends to move the rod 52 and the fork 50 in the direction to throw in the clutch. The means for reciprocating the rod 52 to throw the clutch in and out comprises a slide 55 carried by the segment 45 and guided by means of the rod 52 and a screw 56, said rod and screw extending through slots 57 in the slide. On the slide 55 are two cams 58 (Figs. 6 and 9) arranged to be engaged by rollers 59 on the rod 52. A cable 60 connected to the slide and to the cable 41ª and running over a guide sheave 61 affords means for pulling the slide in the direction to remove the cams 58 from beneath the rollers 59 and thus to allow the spring 54 to throw in the clutch. When the toggle has been nearly straightened, the link 33 strikes a pin 62 on the slide 55 and thereby moves the slide in the direction to place the cams 58 beneath the rollers 59, thus throwing out the clutch. The spring 40 completes the straightening of the toggle, as the clutch collar 48 is being moved clear of the clutch member 47.

The rear end of the main frame 1 is supported upon the rear furrow wheel 63, said wheel being mounted upon a spindle 64 which is secured to a casting 65. The latter is pivoted at 66 to a bracket 67 fixed to the plow beam 2. A lever 68 is pivoted to the bracket 67 at 69 and is connected to the casting 65 through a link 70. To lock the lever 68 against swinging movement, we provide a latch 71 pivoted to the lever 68 at 72 and having a hooked end to engage a projection 73 on the bracket 67. A tension spring 74 connected at one end to the plow beam 2 and at its other end to a link 75 which is pivoted to the lever 68 partially counterbalances the weight of the rear end of the frame.

The means for operating the latch 71 to release the lever 68, and for pulling said lever forward to raise the rear end of the frame, comprises a rod 76 pivoted at its forward end to the link 24 and slidably supported at its rear end in a slot 77 in the link 75. The rear end of the rod 76 is bent to lie in said slot and to provide a projection 78 (Fig. 3) adapted to press against the upper end of the latch 71.

Rearward movement of the lever 68 is limited by contact of said lever with a stop 79 on the bracket 67.

When the lever 68 is being drawn forward, the latch 71 is prevented from tilting so far forward as to drop behind the projection 73, by a stop lug 80 on said latch, said lug stopping against the lever 68.

Assuming that the parts are in the position shown in Fig. 1, and that plowing is to be resumed, the operation is as follows: The operator pulls the cable 41ª thus causing the cable 41 to flex the toggle, whereupon the forward portion of the main frame settles until the stud 26 stops against the rear end wall of the slot 27. During such lowering of the forward portion of the frame, the shafts 9 and 13 rock so as to place the land wheel 12 and the furrow wheel 16 in proper relative position, as in Fig. 4. As the link 24 completes its rearward movement, the rear end of the rod 76 strikes the latch 71 and disengages the latch from the projection 73, whereupon the spindle 64 swings back, allowing the rear end of the main frame to descend.

It will be evident from Fig. 4 that when the front end of the frame is lowered, the plow bodies are enabled to enter the ground point first, inasmuch as the rear end of the frame is held elevated until the projection 78 strikes the latch 71. The slot 75 is long enough to delay the lowering of the rear end of the frame until the plow points have reached and entered the ground.

When the plow bodies are to be lifted out of the ground, the operator pulls the cable 41ª, thereby pulling the cable 60 to withdraw the cams 58 (Figs. 6 and 9) from beneath the rollers 59, whereupon the spring 54 throws in the clutch. As the tractor continues to advance, the land wheel 12 actuates the gear segment 45 to raise the forward end of the frame. When the plow points have completely emerged from the ground, the bent rear end of the rod 76 engages the forward end wall of the slot 77, and pulls the lever 68 and the spindle 64 into upright position, thus raising the rear end of the frame.

Since the forward end of the frame is raised before the rear end is lifted, the plow bodies are enabled to leave the ground point first, as indicated in Fig. 5.

By a comparison of Figs. 1 and 4 it will be seen that when the cable 41 is relatively taut the cable 60 is relatively slack, and vice versa. Thus the operator can operate the raising and lowering mechanism by pulling the single cable 41ª.

We claim as our invention:

1. A plow having, in combination, a frame, a plow body on the frame, two cranks pivoted to opposite sides of the frame, supporting wheels carried by said cranks, a locking sector pivoted on the axis of one of said cranks, an adjusting lever rigidly connected to said crank and arranged to engage said sector, a link pivoted to the frame, a link connecting said link and the sector, a crank arm rigid with the other crank and linked to the first-mentioned link, a link having a longitudinal slot, a stud on the crank arm lying within said slot, an adjusting lever pivoted to the frame and connected to said slotted link, and a locking sector on the frame arranged to be engaged by the last mentioned adjusting lever.

2. A plow having, in combination, a frame, a plow body on the frame, two cranks pivoted to opposite sides of the frame, supporting wheels carried by said cranks, a lever rigidly connected to one of said cranks at the axis thereof, a link pivoted to the frame, a link connecting said link and the lever, a crank arm rigid with the other crank and linked to the first mentioned link, a link having a longitudinal slot, a stud on the crank arm lying within said slot, an adjusting lever pivoted to the frame and connected to said slotted link, and a locking sector on the frame arranged to be engaged by the adjusting lever.

3. A plow having, in combination, a frame, a plow body on the frame, two cranks pivoted to opposite sides of the frame, supporting wheels carried by said cranks, a lever rigid with one of said cranks, a link pivoted to the frame, a link connecting said link and the lever, a crank arm rigid with the other crank and linked to the first-mentioned link, a link having a longitudinal slot, a stud on the crank arm lying within said slot, and a connection between the frame and said slotted link.

4. A plow having, in combination, a frame, a plow body on the frame, two cranks pivoted to the frame, supporting wheels carried by said cranks, an arm rigid with one of said cranks, a link pivoted to the frame, a link connecting said link and the arm, a crank arm rigid with the other crank and linked to the first mentioned link, a link adjustably connected to the frame, and a lost-motion connection between the last mentioned link and said arm.

5. A plow having, in combination, a frame, a plow-body on the frame, two cranks pivoted to the forward portion of the frame, supporting wheels carried by said cranks, two levers each rigid with one of said cranks, a member pivoted to the rear end of the frame, a furrow wheel carried by said member, means connecting said levers together whereby the cranks are rocked in unison when the levers are operated, a rod connecting said pivoted member and one of said levers and having a lost motion connection with said member, and a lock normally preventing movement of said member in one direction and adapted to be operated by the connecting rod to release said member for movement in the other direction, said lost motion connection between said member and said lever enabling the movement of the rod and the lever to which it is connected before releasing the lock.

6. A plow having, in combination, a frame, a plow-body on the frame, two cranks pivoted to the forward portion of the frame, supporting wheels carried by said cranks, a member pivoted to the rear end of the frame, a furrow wheel carried by said member, means for rocking said cranks in unison including a lever, a rod connecting said pivoted member and said lever, said rod being arranged to move said pivoted member when the cranks are rocked in one direction only, and means for releasably holding said member against movement when the cranks are rocked through the initial portion of their movement in the other direction.

7. A plow having, in combination, a frame, a plow body on the frame, cranks connected to the forward portion of the frame, supporting wheels carried by the cranks, a member pivoted on a horizontal axis to the rear end of the frame, a rear furrow wheel carried by said member, a lock for said member, mechanism for swinging said cranks, and a connection between said mechanism and the lock for operating the latter to permit the member to swing.

8. A plow having, in combination, a frame, a plow body on the frame, members connected to the forward portion of the frame, supporting wheels carried by said members, a member pivoted on a horizontal axis to the rear end of the frame, a rear furrow wheel carried by the last mentioned member, a lock for the last mentioned member, mechanism for moving the first mentioned members, and a connection between said mechanism and the lock for operating the latter to permit the member to swing.

9. A plow having, in combination, a frame, a plow-body on the frame, two cranks pivoted to the frame, supporting wheels carried by said cranks, means for rocking said cranks in unison to raise and lower the frame including two arms each fixed to one of said cranks and connected together, one of said arms being adjustable relative to its crank, a member having a lost motion connection with one of said arms, a hand lever pivoted to the frame and adapted to move said member independently of the arm to which it is connected to vary the position thereof relative to the frame, and means for locking said lever and thereby said member in adjusted position to vary the extent of rocking movement of said cranks.

10. A plow having, in combination, a frame, a plow body on the frame, two parallel rock shafts journaled in the frame, a crank on each of said shafts, said cranks being located at opposite sides of the frame, supporting wheels carried by said cranks, an arm rigidly connected to one of said shafts, an arm adjustably connected to the other shaft, linkage connecting said arms to each other and to the frame, and adjustable means for limiting the swinging movement of one of said arms.

11. A plow having, in combination, a frame; a plow-body on the frame; two cranks pivoted to the forward portion of the frame; supporting wheels carried by said cranks; a member pivoted to the rear end of the frame; a furrow wheel carried by said member; and means for rocking said cranks in unison and moving said pivoted member including two arms each fixed to one of said cranks and connected together, a link connected to one of said arms, a hand lever pivoted to the frame and adapted to reciprocate said link to swing said arms, and a connection between said pivoted member and one of said crank arms.

12. A plow having, in combination, a frame, a plow body on the frame, a wheel supporting member connected to the frame, a wheel on said member, a toggle interposed between the frame and said member, a spring tending to hold the toggle straight, means for flexing the toggle, and separate means for causing separating movement between said member and the frame to straighten the toggle.

13. A plow having, in combination, a frame, a plow body on the frame, two cranks pivoted to the frame, supporting wheels carried by said cranks, an arm rigid with one of said cranks, an arm adjustably attached to the other crank, linkage connecting said arms to each other and to the frame, and adjustable means for limiting the swinging movement of the cranks.

14. A plow having, in combination, a frame, a plow body on the frame, two cranks pivoted to the frame, supporting wheels carried by said cranks, two arms each rigid with one of said cranks, linkage connecting said arms to each other and to the frame, and adjustable means for limiting the swinging movement of the cranks.

In testimony whereof we have hereunto set our hands.

JOHN C. BOHMKER.
JOHN GEISTWHITE.